United States Patent [19]

Herzog et al.

[11] Patent Number: 4,793,944
[45] Date of Patent: Dec. 27, 1988

[54] CRYSTALLINE LANTHANUM-OXY-HALIDE PHOSPHOR ACTIVATED WITH RARE EARTHS

[75] Inventors: Gerhard Herzog; Detlef Starick; Walter Tews, all of Greifswald; Franz Braunholz, Bad Liebenstein, all of German Democratic Rep.; Aleksander M. Gurvic, Moscow; Svetlana I. Golovkova, Chimki, both of U.S.S.R.; Karl Dietzel, Bad Liebenstein, German Democratic Rep.

[73] Assignee: VEB Mikroelektronik, Leuchtstoffwerk Bad Liebenstein, Bad Liebenstein, German Democratic Rep.

[21] Appl. No.: 103,234

[22] Filed: Sep. 30, 1987

[30] Foreign Application Priority Data

Sep. 30, 1986 [DD] German Democratic Rep. .... WP C 09 K/294 821

[51] Int. Cl.$^4$ ............................................. C09K 11/86
[52] U.S. Cl. ............................................. 252/301.4 H
[58] Field of Search ............................... 252/301.4 H

[56] References Cited

U.S. PATENT DOCUMENTS

| 3,795,814 | 3/1975 | Rabatin | 252/301.4 H |
|---|---|---|---|
| 4,246,485 | 1/1981 | Bossomaier et al. | 252/301.4 H |
| 4,315,979 | 2/1982 | Brines et al. | 252/301.4 H |
| 4,316,092 | 2/1982 | Rabatin | 252/301.4 H |
| 4,360,571 | 11/1982 | Rabatin | 252/301.4 H |
| 4,478,933 | 10/1984 | Rabatin | 252/301.4 H |
| 4,499,159 | 2/1985 | Brines et al. | 252/301.4 H |
| 4,532,070 | 7/1985 | Rabatin | 252/301.4 H |
| 4,578,211 | 3/1986 | Rabatin | 252/301.4 H |

FOREIGN PATENT DOCUMENTS 61-66786 4/1986 Japan ................. 252/301.4 H

*Primary Examiner*—Jack Cooper
*Attorney, Agent, or Firm*—Klein & Vibber

[57] ABSTRACT

The invention concerns a crystalline lanthanum-oxyhalide phosphor activated with rare earths which emits light in the ultraviolet and blue spectral range by high-energy excitation, particularly X-ray excitation. Such phosphors are used, for instance, in X-ray image converters, particularly in X-ray amplifying screens. It is the object and purpose of the invention to state a new oxy-halide phosphor with changed composition which ensures a high image quality of corresponding amplifying screens and at sufficiently little phosphorescence renders an optimal conversion of the X-rays to the photographically effectual luminescence possible. This is achieved by simultaneous use of thulium and gadolinium as activators where the phosphor represents the general formula $La_{1-y-z}OX:Tm_y{}^{3+}$, in which X=Cl and/or Br and y represents values from 0.0001 to 0.1 preferably from 0.0005 to 0.005 as well as z represents values from 0.001 to 0.3 preferably from 0.002 to 0.05. These phosphors can be manufactured in a simple manner, for instance, by converting a mixed oxide of lanthanum, thulium and gadolinium with a suitable ammonium halide, followed by a recrystallization of the resulting materials and adding fluxes. The emission spectrum of such phosphor is illustrated in FIG. 1.

2 Claims, 1 Drawing Sheet

CRYSTALLINE LANTHANUM-OXY-HALIDE PHOSPHOR ACTIVATED WITH RARE EARTHS

FIELD OF THE INVENTION

The invention relates to a crystalline lanthanum-oxyhalide phosphor, activated with rare earths which emits light mainly in the ultra-violet and blue spectral range by high-energy excitation (for instance, γ-(gamma), X-ray- or cathode ray excitation). Such phosphors are used for instance in X-ray amplifying screens and other X-ray image converters, including cathode ray tubes.

DESCRIPTION OF PRIOR ARTS

Lanthanum-oxy-halide phosphors, activated with rare earths are generally known from various literature. They have been described for instance in the U.S. Pat. Nos. 3,617,743; 3,606,676; and 3,795,814. For use in X-ray image converters, which consist of combinations of X-ray amplifying screens and unsensitized X-ray films, lanthanum-oxy-halide phosphors, activated with terbium and thulium, are mostly suitable. With it, the luminophors, doped with thulium, excel in an increased image quality in comparison with LaOX:$Tb^{3+}$-phosphors (X=Cl and/or Br). This is because of the reduction of the cross-over effect of the LaOX:$Tm^{3+}$-luminophors. This effect consist in the fact that a part of the luminescence of the amplifying screen penetrates the emulsion coating that is turned towards it and the carrier of the film that is sprinkled on both sides and blackens the emulsion coating opposite to the screen. This phenomenon comes along with an increase of the lack of picture definition.

The lanthanum-oxy-halide phosphors, activated with thulium, render an effective conversion of the X-rays to ultraviolet and blue, and thus, photographically effectual luminescence is possible.

Indeed, the content of the $Tm^{3+}$-activator has to be increased over the value that is presumed to be optimal to reduce the undesirable phosphorescence the named phosphors show at too little concentration of activator to the required level. This causes a reduction of the attainable phosphor and screen effectivity. The method practiced in case of lanthanum-oxy-halide phosphors, doped with terbium, to reduce phosphorescence, for instance by the additional inserting of ytterbium into the host lattice of LaOBr (U.S. Pat. No. 3,666,676), fails in the case of LaOX-luminophors, doped with thulium.

SUMMARY OF THE INVENTION

It is thus the object of the present invention to disclose a new coactivated lanthanum-oxy-halide phosphor, which has greatly improved characteristics in comparison with the known lanthanum-oxy-halides, activated exclusively with thulium.

DETAILED DESCRIPTION

Figure 1:
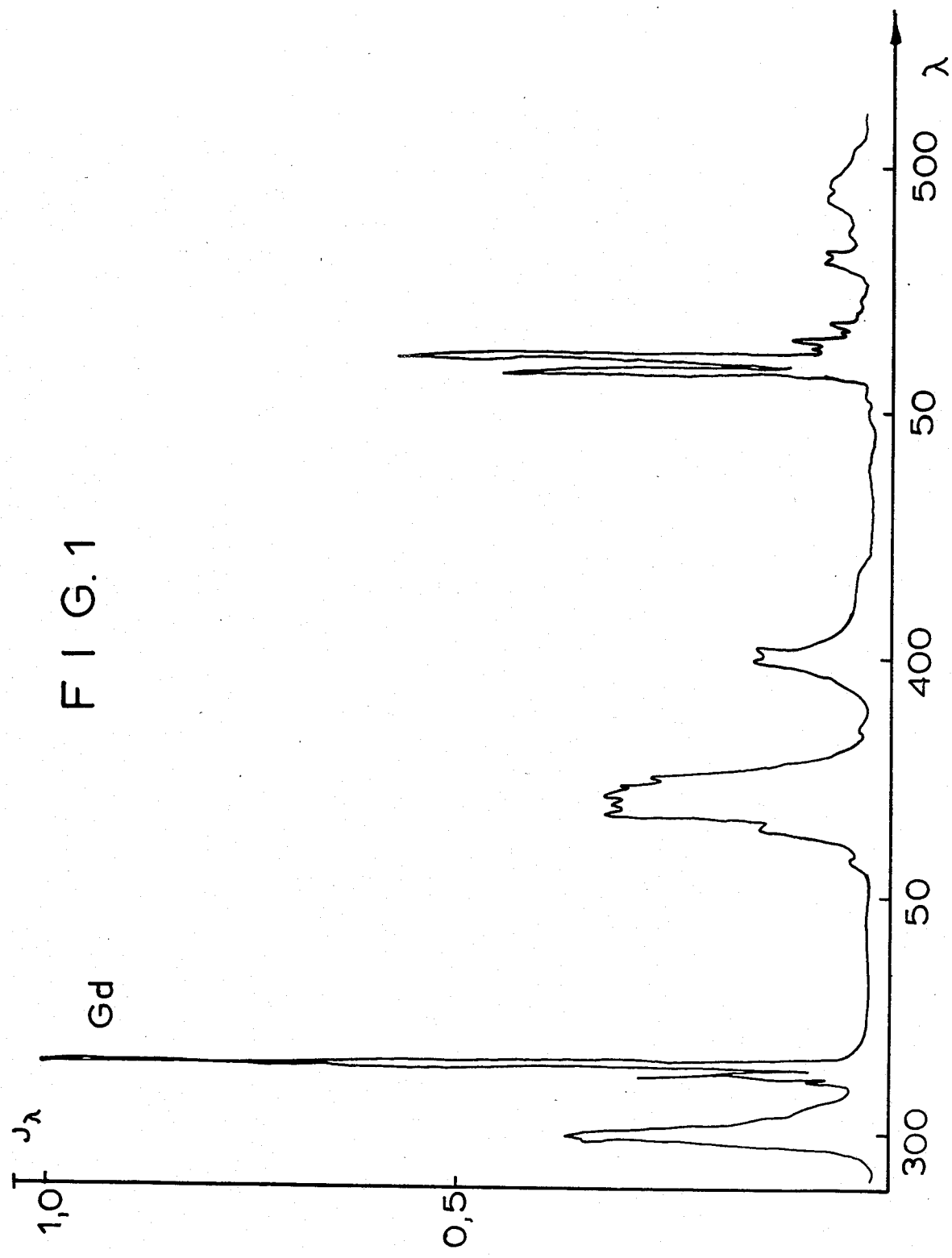

According to the hitherto existing technique in special X-ray image converters, particularly in the X-ray amplifying screens applied in medical X-ray diagnostics, $Tm^{3+}$-doped lanthanum-oxy-halide phosphors are used, which render an effective conversion of the X-ray to photographically effectual light possible, and ensure, by reason of an cross-over effect minor to that of other luminophors, a high image quality at a corresponding X-ray photograph.

Indeed these phosphors have a disadvantage in that the content of the $Tm^{3+}$-activator has to be raised over the optimal value in order to reduce the undesirable phosphorescence of these luminophors to the required level. Consequently, the capability of the system cannot be used to the full extent for the X-ray conversion.

The present invention overcomes the above problems by the presently claimed lanthanum-oxy-halide phosphor, which is activated with rare earths and changed in the composition. This improved lanthanum-oxy-halide phosphor has characteristics favorable for image converters, particularly of X-ray amplifying screens, and which, at sufficiently low phosphorescence, renders at the same time an optimal conversion of X-rays to a luminescence possible, which is adapted to the spectral sensitivity of unsensitized photographic emulsions and by this an increase of the amplifying effect in comparison with LaOBr:$Tm^{3+}$-X-ray amplifying screens.

According to the present invention, this object is attained by using simultaneously thulium and gadolinium as activators, which gives the phosphor the general formula

$$La_{1-y-z}OX:Tm_y^{3+}, Gd_z^{3+}$$

where X=Cl and/or Br and y represents values from 0.0001 to 0.1, preferably from 0.0005 to 0.005 and z represents values from 0.001 to 0.3, preferably from 0.002 to 0.05. It was astonishing and unexpected to discover that the additional inserting of $Gd^{3+}$-ions into the $Tm^{3+}$-doped LaOX-lattices (coactivation) resulted in a considerable increase of the photographic effect of the luminophors respectively of the X-ray amplifying screen made from them. This has been demonstrated in Table 1 and may be attributed to the $Tm^{3+}$-ions caused conversion of a part of the excitation energy not utilized by the $Tm^{3+}$-ions to an additional photographically effectual luminescence appearing at the range of 310–320 mm (intrinsic emission) respectively to the increase of the intensity of $Tm^{3+}$-luminescence by an effective $Gd^{3+}\rightarrow Tm^{3+}$-energy transfer (sensitization). Which of the named effects prevails depends among other things on the quantity relation of the $Tm^{3+}$- and $Gd^{3+}$-ions. The data listed in Table 1 were obtained by X-ray excitation of 80 kV (Cu-filter 0.4 mm). A customary unsensitized X-ray film type HS-11 served as radiation detector. The Table also demonstrates that the phosphorescence of the $La_{1-y-z}OX:Tm_y^{3+}, Gd_z^{3+}$-phosphors can be held on the required level, for instance, by suitable choice of the $Tm^{3+}$-content. The lanthanum-oxy-bromide phosphors coactivated with $Tm^{3+}$ and $Gd^{3+}$ can be synthesized, for instance, according to the process of manufacturing of rare-earth oxy-halides and rare-earth-oxy-halide phosphors described in GDR-patent (DDR-PS) 226, 900 where in the case in question the starting materials have to be mixed oxides of lanthanum, thulium, and gadolinium, respectively mixed oxalates of lanthanum, thulium, and gadolinium. At first, the mixed oxide of lanthanum, thulium and gadolinium respectively a corresponding mixed oxalate is decomposed to a mixture of rare-earth-oxy-halide/rare-earth-trihalide at a temperature between 650 K. and 1400 K. by means of as definite excess of ammonium halide. Subsequently, the oxy-halide phosphors are recrystallized, for instance, by annealing this mixture at a temperature between 1055 K. and 1500 K. where a definite quantity of alkali halide can be added to the material that is to be annealed if necessary. After finishing the recrystallization process, the fluxes that have been used can be removed by washing with water. After drying the phosphors appear in a good crystallized form and show the favorable characteristics for the use in X-ray image converter, particularly in X-ray amplifying screens as described.

In the general formula of the new phosphor composition, the lanthanum may be substituted partially by yttrium and/or lutetium if necessary. Also, in addition to thulium and gadolinium other elements selected from the group consisting of cerium, praseodymium, ytterbium, plumbum and thallium can be used in order to obtain definite properties of the phosphor.

Further details of the invention are explained by means of an example for preparation and a drawing.

100 g of a mixed oxide of lanthanum, thulium and gadolinium of the composition $La_{0.976}Tm_{0.004}Gd_{0.02}O_3$ are mixed with 82 g ammonium bromide intensively and converted into a mixture of corresponding coactivated lanthanum-oxy-bromide, phosphor, and lanthamum-tribromide in two hours at 700 K. in covered crucibles of sintered corundum.

Susequently, 100 g of this mixture are mixed with 12 g kalium bromide and annealed once more one hour at 1170 K. in covered crucibles. After finishing the recrystallization the remaining fluxes are removed by washing with water the resulting phosphor is dried and shows the advantageous characteristics of luminescence as described.

FIG. 1 shows the emission spectrum of this phosphor which has the composition $La_{0.988}OBr:Tm_{0.002}^{3+}$, $Gd_{0.01}^{3+}$, registered at X-ray excitation (30 kV, 5 mA, Al-filter 0.4 mm). In this figure, the wavelength is plotted on the vertical axis and the relative spectral intensity of luminescence is plotted on the horizontal axis. The figure illustrates that at this phosphor an additional emission band appears in the range of 310 nm and 320 nm which is designated by Gd in contrary to a $LaOBr:Tm_{0.002}^{3+}$-luminophor.

A phosphor with such emission spectrum shows a small crossover and enables to manufacture X-ray amplifying screen with high image quality.

TABLE 1

| Phosphor composition | Photographic effect (blackening above the veil) of the luminescence | Photographic effect of the phosphorescence X-ray exitation 1 min. dark period: 3 min. film contact: 24 hrs |
|---|---|---|
| $La_{0.998}OBr:Tm_{0.002}^{3+}$ | 0.95 | 0.06 |
| $La_{0.997}OBr:Tm_{0.002}^{3+}, Gd_{0.001}^{3+}$ | 0.98 | 0.01 |
| $La_{0.996}OBr:Tm_{0.002}^{3+}, Gd_{0.002}^{3+}$ | 1.21 | 0.03 |
| $La_{0.993}OBr:Tm_{0.002}^{3+}, Gd_{0.005}^{3+}$ | 1.43 | 0.04 |
| $La_{0.988}OBr:Tm_{0.002}^{3+}, Gd_{0.01}^{3+}$ | 1.32 | 0.04 |

Although the invention is described and illustrated with reference to a particular embodiment thereof, it is to be expressly understood that it is in no way limited to the disclosure of such preferred embodiment but is capable of numerous modifications within the scope of the appended claims.

We claim:

1. A crystalline lanthanum-oxy-halide phosphor, activated with $Tm^{3+}$ and $Gd^{3+}$ for the conversion of X-radiation to photographically effectual ultraviolet and blue luminescence, the phosphor consisting essentially of $$La_{1-y-z}OX:Tm_y^{3+}, Gd_z^{3+}$$

where X is Cl and/or Br, and y is from 0.0001 to 0.1, and z is from 0.001 to 0.3, and exhibiting a smaller phosphorescence then said phosphor absent $Gd^{3+}$.

2. A crystalline lanthanum-oxy-halide phosphor as in claim 1 wherein y is from from 0.0005 to 0.005, and z is from 0.002 to 0.05.

* * * * *